Sept. 14, 1965 T. F. CORBIN, JR., ETAL 3,206,430
STABILIZATION OF POLYAMIDES WITH MANGANOUS HYPOPHOSPHITE
OR ACETATE AND CEROUS OXALATE
Filed Nov. 3, 1961

INVENTORS.
THOMAS F. CORBIN Jr.
LOLA M. OWNBEY
BY

ATTORNEY

United States Patent Office 3,206,430
Patented Sept. 14, 1965

3,206,430
STABILIZATION OF POLYAMIDES WITH MANGANOUS HYPOPHOSPHITE OR ACETATE AND CEROUS OXALATE
Thomas F. Corbin, Jr., West Asheville, and Lola M. Ownbey, Enka, N.C., assignors to American Enka Corporation, Enka, N.C., a corporation of Delaware
Filed Nov. 3, 1961, Ser. No. 150,059
1 Claim. (Cl. 260—45.75)

This invention relates to a novel process for the stabilization of polyamide compositions to prevent discoloration and deterioration of the same by the action of light. More particularly, this invention is concerned with the incorporation of stabilizing agents which are especially compatible with polyamides and provide improved light stabilization properties. More specifically, this invention relates to a synergistic combination of stabilizing agents for polyamides and the products obtained thereby.

Unpigmented yarns made from synthetic linear polymers are very durable upon exposure to light, approaching cotton and linen in light stability. Pigmentation and other treatments which reduce the inherent luster of synthetic polymeric textile materials are well known in the art, and these treatments result in increased consumer acceptance of the goods so treated. However, the amount of conventional pigment sufficient to bring about adequate delustering produces undesirable side effects, such as slight discoloration and reduction in the light durability.

It is known that polymeric shaped articles, filaments, yarns, threads, and the like are sensitive to sunlight, especially when they contain a white pigment or delustering agent, such as finely divided titanium dioxide. The light sensitivity of these polymeric products severely reduces their utility. Such sensitivity is evidenced not only by discoloration but also by a reduction in such properties as tensile strength and elongation upon exposure to light. Oxygen and dampness will further accelerate the deteriorating effect of light.

In textile applications, an increasing yellowing or other discoloration of synthetic linear polymer fibers or filaments is an extremely deleterious feature. Delustered polyamide materials are especially sensitive to light when they contain titanium dioxide.

In order to improve the light stability of polyamides, and particularly those containing a titanium dioxide delustrant, it has been proposed that certain heavy metal salts be incorporated in the polymer. Salts of copper, chromium, cobalt, nickel, strontium, barium, cadmium, zinc, lead, tin, calcium, and manganese have ordinarily been employed.

However, certain of these heavy metal salts cause a severe gray discoloration, especially in those cases where the polyamide is exposed to moist air or to a sulfur-containing industrial atmosphere. The same results can be observed with sulfurous bleaching agents. In these instances, the graying is several times more severe than would be obtained with an untreated polyamide product. Manganese dioxide and cobalt sulfide appear to be the most objectionable impurities which can be formed in a polyamide which has been treated with heavy metal salts.

Accordingly, one of the objects of the present invention is to provide a novel process for the stabilization of polyamide compositions which will be free from the foregoing and other disadvantages.

Another important object of the present invention is to provide a novel light stable polyamide composition.

Still another object of the present invention is to provide a new and improved process for the protection of polyamides from objectionable discoloration by incorporating therein a novel combination of light stabilizing agents.

Another object of the present invention is to provide a process for the stabilization of polyamides whereby the polyamides will retain their desired tensile strength and elongation after a relatively long exposure to light.

A further object of the invention is the use of a combination of heavy metal salts as a polyamide light stabilizing agent and photooxidation preventative.

Yet another object of the invention is to provide specific stabilizing agents having a high degree of compatibility with a polyamide material.

These and other objects and advantages of the present invention will become apparent with reference to the following detailed description.

In its broadest aspect, the instant invention is predicated up the discovery that the use of certain light stabilizing agents, when used in combination with synthetic polyamides, produce an unexpected light-durable composition that is greatly resistant to photo-oxidation.

One such stabilizing agent is cerous salt, described and claimed in application Serial No. 62,344, filed October 13, 1960, and having common ownership herewith.

In accordance with the present invention, it has unexpectedly been found that the combination of a manganous salt such as manganous acetate or manganous hypophosphite, with a cerous salt such as cerous chloride or cerous oxalate, when added to a polyamide composition in polymerized or unpolymerized form, provides a polyamide composition with superior light stability properties.

The particular combination of manganous acetate, or manganous hypophosphite, with cerous oxalate used in this invention as a light stabilizing composition, is a novel composition which exhibits a synergistic effect.

A synergistic effect is demonstrated when two or more substances in combination show an unexpectedly unusually high improvement in a physical or chemical property.

The improvement in light stability and strength retention achieved with the novel combination of manganous salts and cerous salts in polyamide compositions could not have been predicted.

In the novel light stabilizing synergistic composition of the present invention, the proportions of manganous salts to cerous salts which are added to a polyamide composition may be varied over a wide range. Preferably, the proportion may range from about 1 to 1 to about 1 to 16 parts of manganous acetate or hypophosphite to parts of cerous oxalate, respectively. The total amount of the light stabilizing synergistic composition of this invention that will be added to a polyamide may vary within a wide range. Preferably, from about 10 parts per million (based on the weight of the polyamide) to about 450 parts per million may be successfully employed.

The invention will now be explained further by means of the following examples. However, it should be understood that these are given merely by way of illustration, and that many changes in the details may be made without departing from the spirit or scope of the present invention.

In Examples 1 to 8, the cations and anions were added to the lactam prior of polymerization. In Examples 9 to 28, the cations and anions were added to an already polymerized caprolactam containing titanium dioxide anatase delustrant. In the following examples, parts and percentages are by weight unless otherwise indicated. Examples 1 to 5 and 9 to 18 were run with single salts for comparison purposes. The remaining examples empoly both manganous and cerous salts.

EXAMPLE 1

A solution of manganous acetate was added to epsilon caprolactam monomer containing 2% anatase titanium dioxide dispersed in the monomer. The acetate was added in an amount sufficient to incorporate 25 parts per million (p.p.m.) of manganous ion calculated on the weight of polymerized epsilon caprolactam. This solution was polymerized and then extruded, cut into chips, washed and dried in a manner well known in the art. These chips were then melt spun through a spinneret having 8 orifices to produce a yarn or tow having 40 denier (40/8) after drawing. A standard Fadeometer light exposure test was run on a yarn sample and the percentage of original strength retained by the yarns after forty hours' exposure was determined. This yarn, containing 25 p.p.m. manganous (based on the weight of the polymerized caprolactam), retained 74% of its original strength.

EXAMPLE 2

The procedure of Example 1 above was followed except that manganous hypophosphite was substituted for the manganous acetate of Example 1 in an amount sufficient to incorporate 25 p.p.m. manganous ion calculated on the weight of the polymerized epsilon caprolactam. A Fadeometer test was run and after forty hours' exposure it was determined that this 40 denier yarn containing 8 filaments also retained 74% of its original strength.

EXAMPLE 3

The procedure of Example 1 above was again followed except that cerium oxalate was substituted for the manganous acetate of Example 1 in an amount sufficient to incorporate 200 p.p.m. of cerous ion calculated on the weight of the polymerized caprolactam. A Fadeometer test was performed, identical in all respects to Examples 1 and 2. This 40 denier yarn containing 8 filaments (40/8) retained 81% of its original strength.

EXAMPLE 4

The procedure of Example 1 above was again followed except that cerium oxalate was substituted for the manganous acetate of Example 1 in an amount sufficient to incorporate 400 p.p.m. of cerous ion calculated on the weight of the polymerized caprolactam. A Fadeometer test was performed, identical in all respects to Examples 1 and 2. This 40/8 yarn retained 81% of its original strength.

EXAMPLE 5

The procedure of Example 1 above was followed except that manganous hypophosphite was substituted for the manganous acetate of Example 1 in an amount sufficient to incorporate 50 p.p.m. of manganous ion calculated on the weight of the polymerized epsilon caprolactam. A Fadeometer test was run and after forty hours' exposure, it was determined that this 40 denier yarn containing 8 filaments retained 83% of its original strength.

EXAMPLE 6

A solution of epsilon caprolactam was prepared containing 2% anatase titanium dioxide. To this caprolactam monomer was added manganous acetate and cerium oxalate sufficient to yield 25 p.p.m. of manganous and 200 p.p.m. of cerous ions in the resultant polymerized caprolactam. The caprolactam solution was then polymerized and extruded in a manner well known in the art. The extrudate was cut into chips and the chips were washed and dried. These chips were then melt spun through a spinneret containing 8 orifices to produce a 40 denier yarn containing 8 filaments. A Fadeometer test was run on this yarn and after forty hours' exposure, it was determined that this yarn, containing both manganous and cerous ions, retained 87% of its original strength.

EXAMPLE 7

The procedure of Example 6 was followed except that cerium oxalate was added in an amount sufficient to yield 400 p.p.m. of the cerous ions. The manganous ion concentration was retained at 25 p.p.m. Following a Fadeometer test of forty hours' duration, it was learned that the 40/8 yarns retained a surprising 91% of their original strength.

EXAMPLE 8

The procedure of Example 6 was again followed except that manganous hypophosphite was substituted for manganous acetate in an amount sufficient to retain a concentration of 50 p.p.m. manganous ions in the polymerized caprolactam. The cerium oxalate concentration was retained at a concentration of 200 p.p.m. of cerous ion. A Fadeometer test was again run. After forty hours' exposure, it was determined that this 40/8 yarn retained an unexpected 93% of its original strength.

Results of the above eight samples are tabulated below:

Table I

| Example No. | Manganous, p.p.m. | Cerous, p.p.m. | Percent strength retention |
|---|---|---|---|
| 1 | 25 (acetate) | 0 | 74 |
| 2 | 25 (hypophosphite) | 0 | 74 |
| 3 | 0 | 200 (oxalate) | 81 |
| 4 | 0 | 400 (oxalate) | 81 |
| 5 | 50 (hypophosphite) | 0 | 83 |
| 6 | 25 (acetate) | 200 (oxalate) | 87 |
| 7 | 25 (acetate) | 400 (oxalate) | 91 |
| 8 | 50 (hypophosphite) | 200 (oxalate) | 93 |

From the above, Examples 3 and 4 show that 200 p.p.m. cerium is the maximum concentration level above which no further protection from light can be derived when cerium alone is added. When 25 p.p.m. manganous is added, however, as shown in Examples 6 and 7, the addition of cerium above the 200 p.p.m. concentration level offers additional protection. This additional protection was totally unexpected and is interpreted as being the result of a synergistic effect. Additional examples (9 through 28) will illustrate this synergistic effect more clearly.

The following light stability tests were devised to demonstrate the length of time required for the strength of the treated synthetic linear polyamide yarns to deteriorate to 50% of their original strength. In this series of tests, the heavy metal salts were added to chips of a polymerized caprolactam that contained 0.44% anatase titanium dioxide delustering agent. These chips were spun in a conventional manner through an 8 orifice spinneret to produce 40 denier yarn.

EXAMPLE 9

An aqueous solution of cerous chloride was added to dry polymerized caprolactam chips to yield 5 p.p.m. cerous ion based on the weight of the chips. The chips were redried after which they were spun to produce 40/8 yarn. Samples of this yarn were subjected to light exposure in a Fadeometer and to ultraviolet light exposure in an ultraviolet light (UV) Box [1]. Twenty hours were

---

[1] The ultraviolet light (UV) box contains six ultraviolet tubes mounted in parallel in two banks of three tubes in an enclosed box. The banks were located on opposite walls of a rectangular shaped box at a distance of 25 centimeters. Yarn samples were mounted half-way between the two banks. The light tubes were of a type manufactured by General Electric Company, rated at 30 watts and emitted light in the wavelength range of 320–400 millimicrons. Since flow of air in and out of the box was somewhat restricted, the inside temperature normally rose to about 53° C. This ultraviolet light box was located in a room in which the temperature and relative humidity were controlled at 20° C. and 65%, respectively.

required for the yarn sample in the Fadeometer to degrade to 50% of its original strength. The yarn sample in the UV Box required 2.7 days to degrade to 50% of its original strength.

EXAMPLE 10

The procedure of Example 9 was repeated, incorporating 10 p.p.m. of cerous in the polycaprolactam. The Fadeometer test required 23 hours for the 40/8 yarn to degrade to 50% of its original strength. A 50% strength degradation required 2.9 days in the UV Box.

EXAMPLE 11

The procedure for Example 9 was repeated, incorporating 20 p.p.m. of cerous in the polycaprolactam. The Fadeometer test required 32.5 hours for the 40/8 yarn to degrade to 50% of its original strength. A 50% strength degradation required 3.1 days in the UV Box.

EXAMPLE 12

The procedure of Example 9 was repeated, incorporating 40 p.p.m. of cerous in the polycaprolactam. The Fadeometer test required 48 hours for the 40/8 yarn to degrade to 50% of its original strength. A 50% strength degradation required 4 days in the UV Box.

EXAMPLE 13

The procedure of Example 9 was repeated, incorporating 80 p.p.m. of cerous in the polycaprolactam. The Fadeometer test required 51 hours for the 40/8 yarn to degrade to 50% of its original strength. A 50% strength degradation required 5.1 days in the UV Box.

EXAMPLE 14

Cerous chloride solution was added to polymerized caprolactam chips to yield 5 p.p.m. cerous ion. A sodium oxalate salt solution was added to the chips in an amount sufficient to bring three oxalate ions for each two cerous ions in the final mixture. The chips were redried after which they were spun in a well known manner through an 8 orifice spinneret to produce 40 denier yarn. A Fadeometer test was run and 18.2 hours were required to degrade a yarn sample to 50% of its original strength. It required 2.8 days to degrade a similar sample to 50% of its original strength in the UV Box.

EXAMPLE 15

The procedure of Example 14 was repeated, incorporating 10 p.p.m. of cerous ion (added as cerous chloride) in the polycaprolactam. Sufficient oxalate salt was also added to bring three oxalate ions for each two cerous ions in the final mixture. The Fadeometer test required 28.5 hours for the yarn to degrade to 50% of its original strength. A 50% strength degradation required 2.9 days in the UV Box.

EXAMPLE 16

The procedure of Example 14 was repeated, incorporating 20 p.p.m. of cerous ion (added as cerous chloride) in the polycaprolactam. Sufficient oxalate salt was also added to bring three oxalate ions for each two cerous ions in the final mixture. The Fadeometer test required 36 hours for the yarn to degrade to 50% of its original strength. A 50% strength degradation required 3.2 days in the UV Box.

EXAMPLE 17

The procedure of Example 14 was repeated, incorporating 40 p.p.m. of cerous ion (added as cerous chloride) in the polycaprolactam. Sufficient oxalate salt was added to bring three oxalate ions for each two cerous ions in the final mixture. The Fadeometer test required 55.7 hours for the yarn to degrade to 50% of its original strength. A 50% strength degradation required 4.5 days in the UV Box.

EXAMPLE 18

The procedure for Example 14 was repeated, incorporating 80 p.p.m. of cerous (added as cerous chloride) in the polycaprolactam. Sufficient oxalate salts were also added to bring three oxalate ions for each two cerous ions in the final mixture. The Fadeometer test required 61.8 hours for the yarn to degrade to 50% of its original strength. A 50% strength degradation required 5.8 days in the UV Box.

EXAMPLE 19

Manganous acetate and cerous chloride were added to dry chips of polymerized caprolactam containing 0.44% anatase titanium dioxide delustering agent, in an amount sufficient to yield a concentration of 5 p.p.m. of manganous ion and 5 p.p.m. of cerous ion. Sufficient oxalate salts were also added to bring three oxalate ions for each two cerous ions in the final mixture. These chips were redried, after which they were spun through an 8 orifice spinneret to product 40 denier yarn. Samples of this 40/8 yarn were subjected to a Fadeometer test and an UV Box test. A 50% strength degradation was achieved after 75.8 hours in the Fadeometer. It required 4.3 days to reach a 50% strength degradation in the UV Box.

EXAMPLE 20

The procedure of Example 19 was repeated, maintaining the manganous ion concentration at 5 p.p.m. Sufficient cerous chloride was added to bring the cerous ion concentration to 10 p.p.m. and sufficient oxalate salts were also added to bring three oxalate ions for each two cerous ions in the final mixture. A 50% strength degradation was reached after 60 hours in the Fadeometer. The same strength degradation required 4.5 days' exposure in the UV Box.

EXAMPLE 21

The procedure for Example 19 was repeated, maintaining the manganous ion concentration at 5 p.p.m. Sufficient cerous chloride was added to bring the cerous ion concentration to 20 p.p.m. and sufficient oxalate salts were also added to bring three oxalate ions for each two cerous ions in the final mixture. A 50% strength degradation was reached after 52 hours in the Fadeometer. The same strength degradation required 5.3 days' exposure in the UV Box.

EXAMPLE 22

The procedure for Example 19 was repeated, maintaining the manganous ion concentration at 5 p.p.m. Sufficient cerous chloride was added to bring the cerous ion concentration to 40 p.p.m. and sufficient oxalate salts were also added to bring three oxalate ions for each two cerous ions in the final mixture. A 50% strength degradation was reached after 63.5 hours in the Fadeometer. The same strength degradation required 6 days' exposure in the UV Box.

EXAMPLE 23

The procedure for Example 19 was repeated, maintaining the manganous concentration at 5 p.p.m. Sufficient cerous chloride was added to bring the cerous ion concentration to 80 p.p.m. and sufficient oxalate salts were also added to bring three oxalate ions for each two cerous ions in the final mixture. A 50% strength degradation was reached after 74.6 hours in the Fadeometer. The same strength degradation required 6.9 days' exposure in the UV Box.

EXAMPLE 24

The procedure of Example 19 was repeated, adding sufficient manganous acetate to yield a concentration of 10 p.p.m. of manganous ion. Cerous chloride (and corresponding oxalate ion) was added in an amount sufficient to yield a cerous ion concentration of 5 p.p.m. It required 60 hours in the Fadeometer to achieve a 50% strength degradation of the 40/8 yarn. The corresponding ultraviolet light test took 5.3 days.

EXAMPLE 25

The procedure for Example 24 was repeated, maintaining the manganous ion concentration at 10 p.p.m. Sufficient cerous chloride was added to bring the cerous ion concentration (and corresponding oxalate ion) to 10 p.p.m. A 50% strength degradation was reached after 70.2 hours in the Fadeometer. The corresponding UV Box test took 5.6 days.

EXAMPLE 26

The procedure for Example 24 was repeated, maintaining the manganous ion concentration at 10 p.p.m. Sufficient cerous chloride was added to bring the cerous ion concentration (and corresponding oxalate ion) to 20 p.p.m. A 50% strength degradation was reached after 71.2 hours in the Fadeometer. The corresponding UV Box test took 7.1 days.

EXAMPLE 27

The procedure for Example 24 was repeated, maintaining the manganous ion concentration at 10 p.p.m. Sufficient cerous chloride was added to bring the cerous ion concentration (and corresponding oxalate ion) to 40 p.p.m. A 50% strength degradation was reached after 71.2 days in the Fadeometer. The corresponding UV Box test took 8.9 days.

EXAMPLE 28

The procedure for Example 24 was repeated, maintaining the manganous ion concentration at 10 p.p.m. Sufficient cerous chloride was added to bring the cerous ion concentration (and corresponding oxalate ion) to 80 p.p.m. A 50% strength degradation was reached after 81 hours in the Fadeometer. The corresponding UV Box test took 14 days.

The results of Examples 9 to 28 are summarized in Table II below.

*Table II*

| Example No. | Mn++ added as acetate, p.p.m. | Ce+++ added as chloride, p.p.m. | 3 oxalate ions added for each 2 Ce+++ ions | Half-life (hours) Fadeometer* | Half-life (days) UV box* |
|---|---|---|---|---|---|
| 9 | | 5 | No | 20 | 2.7 |
| 10 | | 10 | No | 23.0 | 2.9 |
| 11 | | 20 | No | 32.5 | 3.1 |
| 12 | | 40 | No | 48.0 | 4.0 |
| 13 | | 80 | No | 51.0 | 5.1 |
| 14 | | 5 | Yes | 18.2 | 2.8 |
| 15 | | 10 | Yes | 28.5 | 2.9 |
| 16 | | 20 | Yes | 36.0 | 3.2 |
| 17 | | 40 | Yes | 55.7 | 4.5 |
| 18 | | 80 | Yes | 61.8 | 5.8 |
| 19 | 5 | 5 | Yes | 75.8 | 4.3 |
| 20 | 5 | 10 | Yes | 60.0 | 4.5 |
| 21 | 5 | 20 | Yes | 52.0 | 5.3 |
| 22 | 5 | 40 | Yes | 63.5 | 6.0 |
| 23 | 5 | 80 | Yes | 74.6 | 6.9 |
| 24 | 10 | 5 | Yes | 60.0 | 5.3 |
| 25 | 10 | 10 | Yes | 70.2 | 5.6 |
| 26 | 10 | 20 | Yes | 71.2 | 7.1 |
| 27 | 10 | 40 | Yes | 71.2 | 8.9 |
| 28 | 10 | 80 | Yes | 81.0 | 14.0 |

*Half-life=time for strength of yarn to degrade to 50% of the original strength.

The results obtained from the above illustrative examples have been plotted for convenience to graphically demonstrate the unexpected synergistic improvement that is achieved when the novel composition of this invention is employed as a light stabilizing agent for polyamides.

The lowest line on each graph represents a plot of the cerous ion concentration alone, added as cerous chloride.

Figure 1:
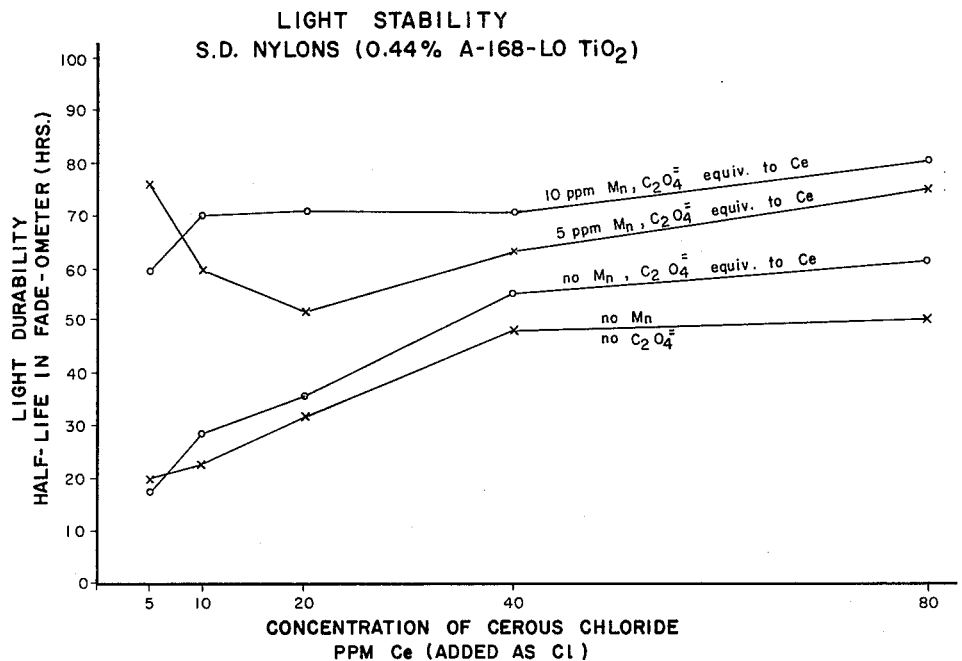
FIGURE 1 is a graph showing Fadeometer light durability of a treated yarn on the ordinate versus the cerous chloride concentration.
Figure 2:
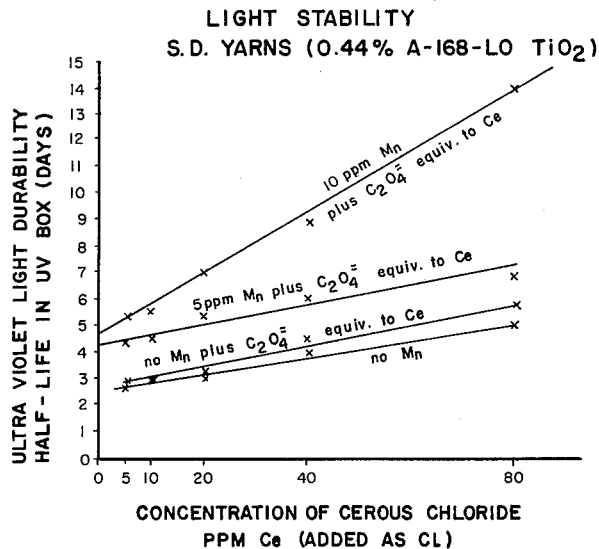
FIGURE 2 is a graph showing ultraviolet light durability of a treated yarn ordinate versus the cerous chloride concentration of this yarn on the abscissa.

It is readily seen from the plots of Examples 9 through 18 that the use of the cerous ion provides increasing light stability with increasing concentration in the range of concentrations studied. When manganese is added, however, the rate of increasing light stability with increasing cerous ion becomes higher. This is shown in FIGURE 2 by plots of Examples 19 to 23 and 24 to 28 where the manganese concentration was 5 p.p.m. and 10 p.p.m., respectively. The profound influence of small increases in the cerous ion concentration when manganese was present, as compared to that when manganese was absent, was completely unexpected and surprising. These results give positive evidence of a synergistic effect since neither manganous acetate nor cerous oxalate alone produces the excellent results achieved in Examples 19 to 23.

From the foregoing tables and examples, it will be readily apparent to those skilled in the art that the combined salts of this invention are superior to the light stabilizing compositions of the prior art. No inherent or substantial discoloration appears to result from use of the additives of the present invention.

It should be understood that many modifications or additions may be made in the practice of this invention without departing from the spirit or scope thereof. It is therefore intended that this invention be limited only to the extent set forth in the following claim.

What is claimed is:

A process for providing a light-stable polyamide composition which comprises the steps of adding to a polyamide composition prior to polymerization up to 450 p.p.m. of a light-stabilizing mixture of a manganous salt selected from the group consisting of manganous hypophosphite and manganous acetate and cerous oxalate to provide from 200 to 400 p.p.m. of cerous ions and from 25 to 50 p.p.m. of manganous ions based on the weight of the polymerized polyamide and the proportion of the manganous salt to cerous salt of from 1:4 to 1:16 by weight.

References Cited by the Examiner

UNITED STATES PATENTS

| 2,671,770 | 3/54 | Chezaud | 260—37 |
| 2,887,462 | 5/59 | Van Oot | 260—37 |
| 2,985,621 | 5/61 | Brandes et al. | 260—45.75 |
| 3,002,947 | 10/61 | Mapel | 260—37 |
| 3,108,091 | 10/63 | Illing et al. | 260—45.75 |

FOREIGN PATENTS

| 1,111,376 | 7/61 | Germany. |
| 767,897 | 2/57 | Great Britain. |
| 904,972 | 6/62 | Great Britain. |

OTHER REFERENCES

Moeller: "Inorganic Chemistry," John Wiley, 1952, pages 639–644.

MORRIS LIEBMAN, *Primary Examiner.*

ALPHONSO D. SULLIVAN, *Examiner.*